United States Patent [19]
Cantone

[11] 3,779,320

[45] Dec. 18, 1973

[54] AGRICULTURAL MACHINE FOR TILLING THE SOIL

[76] Inventor: Natale Cantone, Corso M Prestinari 162, Vercelli, Italy

[22] Filed: Oct. 29, 1970

[21] Appl. No.: 85,021

[30] Foreign Application Priority Data

Nov. 5, 1969 Italy .............................. 61113 A/69
Mar. 3, 1970 Italy .............................. 84604 A/70
July 22, 1970 Italy .............................. 27730 A/70
Sept. 29, 1970 Italy .............................. 30330 A/70

[52] U.S. Cl. ................... 172/60, 172/114, 172/119, 172/123
[51] Int. Cl. ........................................... A01b 33/00
[58] Field of Search .................... 172/123, 118, 119, 172/120, 122, 456, 55, 57, 116, 114, 60

[56] References Cited
UNITED STATES PATENTS

| | | | |
|---|---|---|---|
| 3,133,598 | 5/1964 | Caldwell ........................ | 172/120 X |
| 3,193,022 | 7/1965 | Wesley et al. .................. | 172/119 X |
| 3,401,752 | 9/1968 | Nja ................................ | 172/456 X |
| 2,408,361 | 10/1946 | Bagan ............................ | 172/119 |
| 3,233,686 | 2/1966 | Steadman ...................... | 172/119 |
| 2,957,529 | 10/1960 | Kaller ............................ | 172/123 X |
| 2,410,003 | 10/1946 | Bagan ............................ | 172/119 |
| 3,303,890 | 4/1965 | Vissers .......................... | 172/116 X |

*Primary Examiner*—Stephen C. Pellegrino
*Attorney*—McGlew and Toren

[57] ABSTRACT

A main frame is supported, adjacent its rear end, by a pair of wheels, and the front end of the main frame is arranged for connection to the coupling pin of either a conventional tractor, preferably having a power take-off, or of a separate traction and steering assembly. An independent motor on the main frame drives rotatable ground-engaging agricultural implements supported on the main frame. These implements, when rotated by the independent motor on the main frame, are operable to work the soil, and develop with the soil, a thrust force tending to drive the main frame at a first speed determined by the reaction of the soil. The independent motor on the main frame is more powerful than the power take-off of the associated tractor or of the motor driving the separate traction and steering assembly.

The connection of the main frame to the coupling pin serves to transmit a reaction force between the main frame and the steering and control mechanism. The motor of the tractor or control and steering assembly is independent of the motor on the main frame, and constitutes the sole driving means for the wheels of the tractor or the steering and control mechanism, and tends to drive the tractor or steering and control mechanism at a second speed. The relative speed due to the first and second motors causes a reaction force to be transmitted through the connection coupling the main frame to the tractor or steering and control mechanism, to counteract increases and decreases in the thrust force exerted by the rotating agricultural implements. The main agricultural implement is a rotary hoe carrying laterally projecting tines, and divided into two sections which may be swung to a horizontal position, to extend to either side of the main frame, or to a vertical position, for compactness during transport along a highway or road. Other agricultural components on the main frame may include tanks containing soil treating materials, distributing means connected to these tanks, and other ground working implements.

12 Claims, 15 Drawing Figures

AGRICULTURAL MACHINE FOR TILLING THE SOIL

BACKGROUND OF THE PRIOR ART

This invention relates to a machine for tilling the soil embodying coaxial rotary implements adapted to mechanically work the soil by cutting into it to a depth less than the radius of the implements, as the machine progresses along the ground in a direction substantially perpendicular to the axis about which the implements rotate.

Devices embodying implements of said kind are known and widely used for tilling the soil, particularly for finely comminuting and airing its superficial layers, generally to a depth of about 10–15 cm or slightly more. Such devices are associated, when in use, to conventional agricultural tractors provided with coupling means and power take-off. The tractor furnishes the power required for displacing the device along the ground and also the power for actuating the rotary implements, and is further provided with means for lowering the implements into and lifting them from the ground, the rotary implements carrying device being, for instance, directly supported on the rear of the tractor for lifting or lowering it with respect to this latter, as required. There are rather narrow limits both as to the type of work which these known agricultural machines can furnish (limited to the comminution and airing of surface soil layers) and as to their productivity which can be expressed in terms of area worked per unit of time, this area being defined as the product of the effective ground speed of the machine by the effective width of the strip of land worked in one passage of the machine. In actual operation the best machines of this type known in the art can work, on average soils, a width of about 2 m. to a depth of 10–15 cm, with a ground speed of 3–4 km/h. The work delivered by the machine can be expressed in terms of a volume of soil processed in a unit of time, volume which, based on the aforesaid values, is in the order of 0,240,3 mc/sec. The power required to pull and actuate the known machines is obviously to a great extent dependent on the conditions of the soil (specific weight, cohesion, moisture degree and so on) conditions which also influence the resistance to the progress of the machine and limit the possibility of operating with agricultural tractors of large weights. As an average and highly approximate indication, it can be considered that a conventional agricultural machine of such a type, normally known as a powered hoe, capable of efficiently comminuting the soil and delivering work within the quantitative limits hereinbefore set forth, requires, for drawing and actuating it, a tractor having a power of 60–75 HP and a weight of 2,500–3,000 Kg.

Obviously, power and weight of the tractor on the one hand and size and production capacity of the hoe on the other, increase together. Of course, if a tractor exceeds a certain size, it becomes too costly for a farm wherein its possible uses are limited; but apart from this, if the wieght of the tractor is too great it cannot be used on agricultural land where in general the soil is not compacted; and this is especially true where the soil is soft, impregnated with water, and/or the like, as for instance on rice fields.

Finally, while conventional powered hoes execute very important and frequently needed operations, these cannot take the place of others which require a deeper penetration into the ground such as, typically, those operations that can be properly classified as plowing, even plowing at an average or limited depth, since plowing requires a penetration well beyond 15 cm. Further, known powered hoes generally process the soil by producing a fine comminution of its superficial layer, which is very different from the inversion of surface and sub-surface layers which is typically a result of plowing.

SUMMARY OF THE INVENTION

It is an object of this invention to provide an agricultural machine for processing the soil that is adapted to operate well beyond the limits and effectiveness of known machines, both as to its productivity and as to the nature, type and completeness of the soil processing that it can effect. More specifically it is an object of this invention to provide an agricultural machine embodying rotary implements, that is capable of operating on the soil to a considerable depth and/or on an effective width well above those attainable by means of known machines. It is further an object of this invention to provide an agricultural machine that can operate even on soil that cannot withstand high specific loads, such as rice fields and generally loose soils, and yet can reach a relatively large depth of operation and/or can process strips of ground of large effective width in one passage. A further object of this invention is to provide an agricultural machine embodying rotary implements, which machine has an operative power, avaible to actuate said implements and consequently mechanically to process the soil, that is large, with respect to its overall weight. Still another object of the invention is to provide an agricultural machine having all the aforesaid features, which can be advantageously provided with auxiliary means to form an operative assembly adapted to carry out, while it progresses along the ground, a complete series of operations to prepare the soil for a new cultivation, the operations including mechanical treatments which advantageously take the place of conventional plowing, in particular to a small and medium depth, and further comprise fertilizing even deep fertilizing, seeding, application of chemical agents and so forth.

Other objects of the invention will appear ad the description proceeds. The machine according to the invention comprises a main frame supported for translational motion on the ground, an operative assembly embodying rotary implements for working the soil, and connected in an elevationally displaceable positional relationship to the main frame, a mechanism connected to the main frame for steering and controlling the translational motion, and independently controllable power sources for the operative assembly and the steering and control mechanism. The aforesaid operative assembly which comprises, as means for mechanically processing the soil, the rotary implements, is positioned rearwardly (with respect to the direction of translation of the main frame when in operation) of the points at which the main frame bears on the ground, in such a way as to be displaceable from a raised inoperative position to operative positions in which the rotary implements penetrate into the ground to a depth controllable according to the particular work that is to be carried out in each individual instance.

The weight of the operative assembly may suffice to cause the implements to sink to the required depths, in which case means are provided to limit their penetration into the ground to the desired level, or the operative assembly may be urged downwardly by pressure means having a controllable stroke. The steering and control mechanism is positioned forwardly of the main frame and may be embodied by a conventional tractor provided with coupling means and power take-off, or may be embodied by a fore train kinematically coupled to the main frame.

At least two power sources independently actuate the operative assembly and the steering and control mechanism. These sources generally consist of two separate motors (hereinafter called "operative motor" and "control motor") of any suitable type, but could consist of two independently controllable transmissions powered by a single motor. The first and main power source is preferably supported by the main frame and actuates the operative assembly. The second power source is preferably supported by the steering and control mechanism which it actuates. The second power source, however, is preferably operatively connected or connectable with at least two wheels bearing the main frame, which thus take part, or may take part whenever desired, in the action of the steering and control mechanism.

It has been surprisingly found (as confirmed by experimental data) that a machine as hereinbefore defined can be provided with an operative motor of great power with respect to its overall weight, viz. to the specific load applied by the bearing elements of the main frame to the ground, and that the weight of the steering and control mechanism too can be contained within limits of specific load acceptable even for loose agricultural soils. Further, the ratio between the weight of the steering and control mechanism and that of the main frame and the parts borne by it, and the ratio between the power of the control motor and that of the operative motor, can be kept down to very small values. It has further been found that since, in a machine of this kind, the power available for actuating the rotary implements is large with respect to the overall weight of the machine, if this latter is provided with hoe-like rotary implements of a large diameter (and therefore suited to operate to a considerable depth) and/or extending to a large overall effective operative width, the rotary hoes when acting on the ground, generate thrust forces that are sufficient to move the machine along the ground as required in its operation.

Such forces are however in general more or less in excess of the amount required for said motion and are further strongly variable in various working conditions, and in each given working condition, from one moment to another, and for instance vary from greatly excessive values to insufficient values, so that such forces considered "per se" would tend to render the machine uncontrollable. Further, it has been surprisingly found that a moderate power applied to the steering and control mechanism, specifically a power in the order required in any case to displace the machine from one tract of land to another, permits to neutralize the unfavorable effects of the variability of the propelling forces generated by the operative assembly, which forces therefore can be exploited without drawbacks to cause the machine to advance along the ground. Other objects and characteristics of this invention relate to constructive solutions which contribute fully to achieve the aforesaid and other unexpected advantageous results of the machine. These and other important features of the invention will appear in the course of the following detailed description of specific embodiments of the invention, illustrated in the attached drawings which are an integral part of the present description.

DESCRIPTION OF THE PREFERRED EMBODIMENTS

Figure 1:
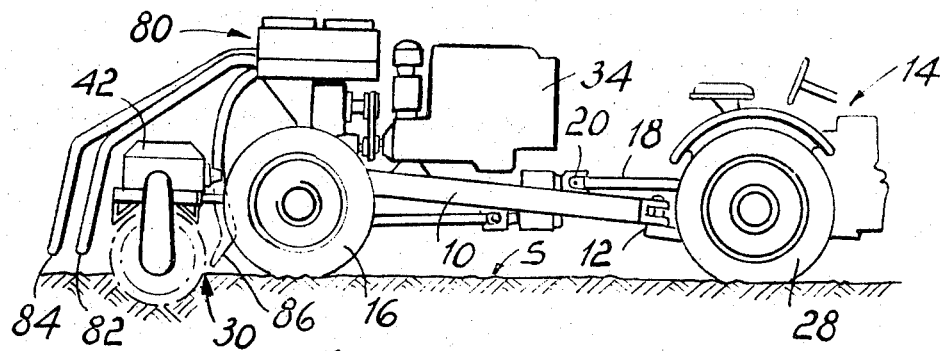
FIG. 1 represents in lateral elevational view and in a diagrammatic form a machine according to one embodiment of the invention, wherein the steering and control mechanism is embodied by a conventional agricultural tractor (fragmentarily illustrated)
Figure 2:
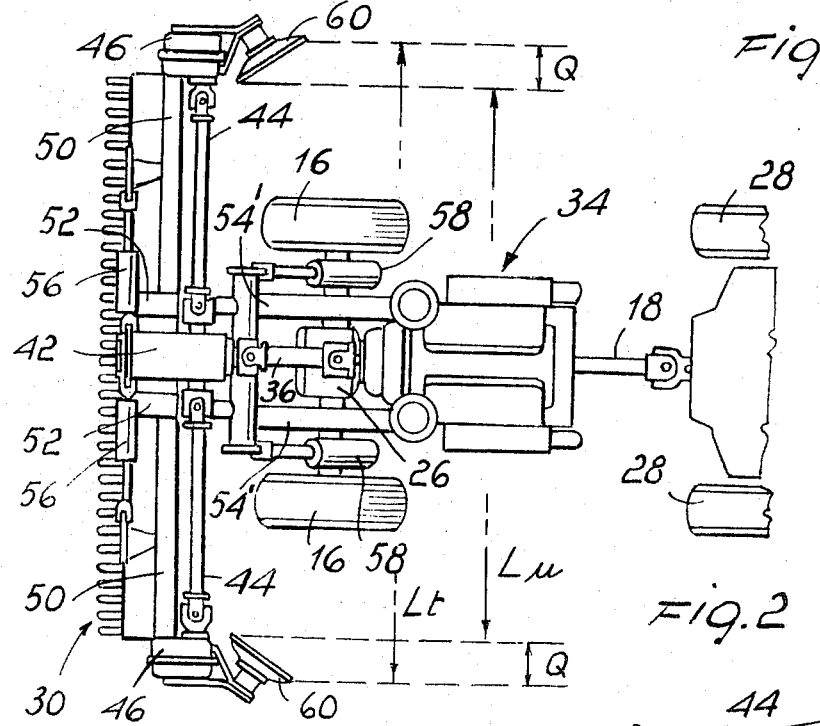
FIG. 2 is a plan view from above of the machine of FIG. 1, in which only the mechanical part of the operative assembly, viz. a hoe assembly, is shown.
Figure 5:
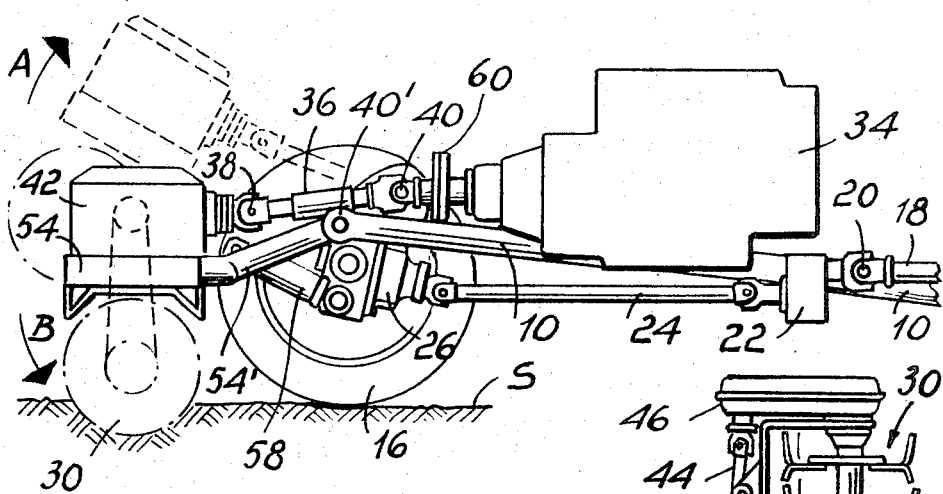
FIG. 5 represents, in lateral elevational view to a greater scale than FIG. 1, an embodiment of the mechanical means for the elevational displacement of the hoe assembly with respect to the main frame of the machine; parts of the machine obstructing the view of said means having been removed.

The general characteristics of the new machine can be understood from an examination of FIGS. 1 and 2. The machine comprises a main frame 10, the forward end of which in the embodiment illustrated in these figures can be connected to the traction hook 12 of a conventional agricultural tractor 14, main frame 10 being supported by a pair of bearing wheels 16 which, whenever desided, can also act as traction wheels inasmuch as they are mechanically connected or connectable to the motor or more exactly to the conventional power take-off of the tractor, by means of a suitable transmission shaft 18, provided with universal or other suitable joints 20. As can be seen in FIG. 5, shaft 18 can be advantageously connected to a transmission box 22, to a secondary shaft 24 and to a differential 26, which can comprise a known mechanism for operatively locking the two bearing (and if desired, traction) wheels 16, to negotiate difficult terrains, and which can also comprise if desired a mechanism for selectively disconnecting the individual wheels, to facilitate turning the machine through small radius curves.

The steering and control assembly, in the case illustrated in FIGS. 1 and 2, is embodied by a tractor 14, conventionally provided with traction wheels 28 and with a steering mechanism (the aforesaid parts not being illustrated), the tractor therefore forming together with the other portions of the machine a functionally unitary assembly, including means for advancing it along the ground, for steering it and for processing the soil.

Figures 7, 8:
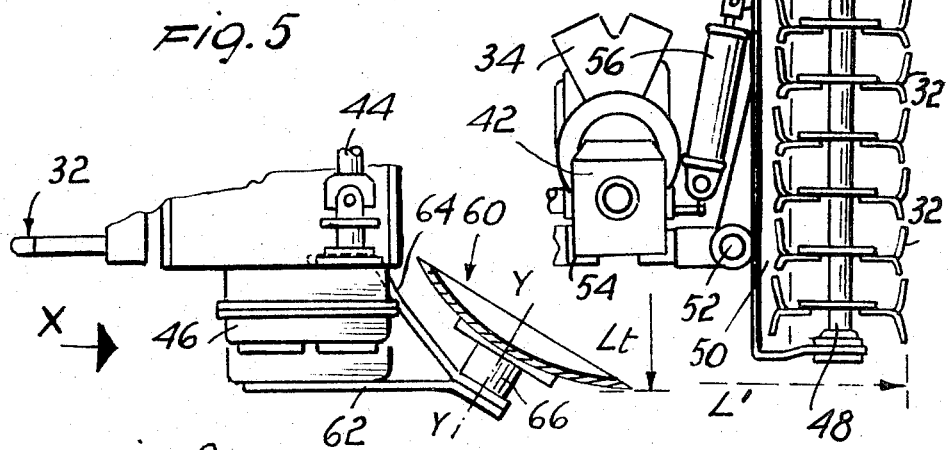
FIGS. 6 and 7 represent, in fragmentary rear view, the hoe assembly respectively in an operative condition and in a condition in which the transverse overall dimension of the machine is reduced, for instance to facilitate its displacements on the road.
FIG. 8 represents, in plan view from above and partially in horizontal cross-section, a detail of auxiliary devices positioned at the sides of the hoe assembly as seen in FIG. 2.
Figure 6:
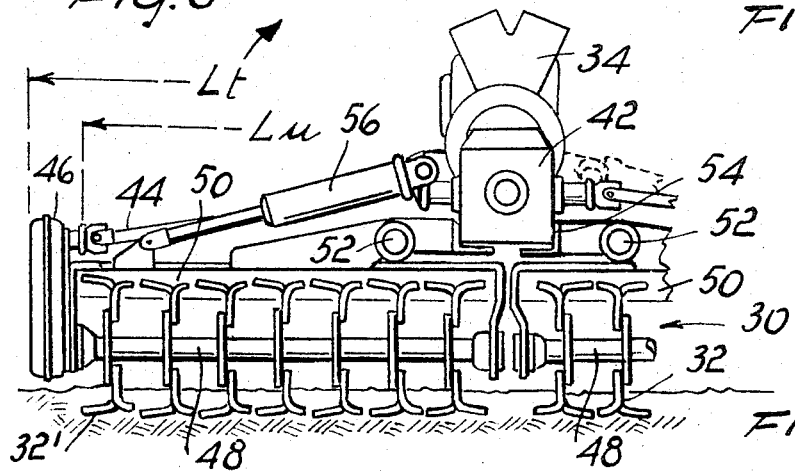

The operative assembly comprises as an essential part thereof the means for the mechanical processing of the soil, which comprise a set or battery 30 of rotary hoes 32 (FIGS. 6 and 7). These rotary hoes are "per se" of a known type, which, while it can be constructed in a variety of shapes and structures, generally comprises a substantially plane rotary support member, e.g., a disc or plate, and operative members such as fingers or tines peripherally carried thereby; which extend substantially laterally out of the plane of rotation of the support member, so as to cut into the ground and detach therefrom fragments or clods of a greater or smaller size.

An example of hoes of such a type is schematically illustrated in FIG. 6 and 7. The rotary hoes employed in carrying out this invention are generally of considerably greater size than those heretofore generally used. They are actuated by operative motor 34, borne by frame 10 and the weight of which bears primarily on wheels 16. The hoes, as can be seen in greater detail in FIGS. 5-7, can be actuated for rotation by motor 34 through a transmission including a primary shaft 36 with universal or other suitable joints 38 and 40, a gear box 42 from which extend transverse secondary shafts 44 and lateral transmission boxes 46 to the outlet shafts of which there are operatively connected shafts 48 on which the individual hoes 32 of the battery 30 are keyed.

Due to the great power of the new agricultural machine, the effective width $L_u$ and the total width $L_t$ thereof (which differ from one another due to the projections Q of the lateral boxes 46) can be very large. Therefore, according to a further complementary feature of this invention, the series or battery 30 of hoes is advantageously divided into two symmetrical groups, individually supported by transverse structures 50 connected, by means of hinges 52 having longitudinal axes, to a central structure or secondary frame 54, suitable mechanical means (such as hydraulic rams 56) being provided to lift said groups from the position of FIG. 7, when required so as to reduce the overall dimensions of the machine to a value L' compatible with the requirements of road travel. Obviously, other solutions can be adapted for such a purpose.

For instance, the symmetrical groups of hoes could be rotated forward or backwards, or about slanted.

Figure 4:
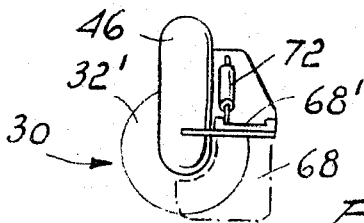
FIG. 3 and 4 represent, in rear and lateral elevational views respectively, devices that can be associated to the lateral ends of the hoe assembly.
Figure 3:
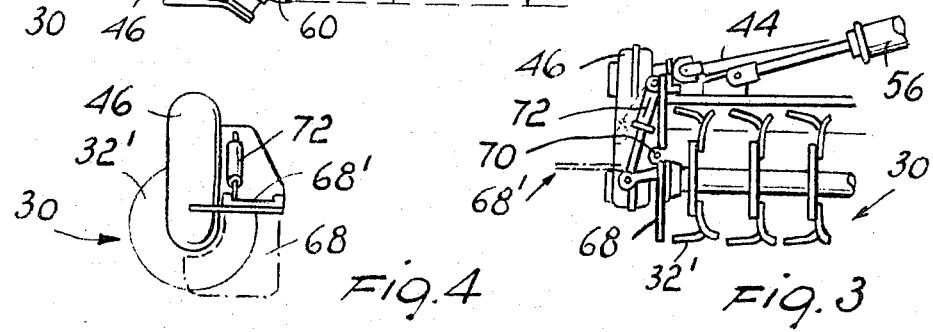
Figure 9:
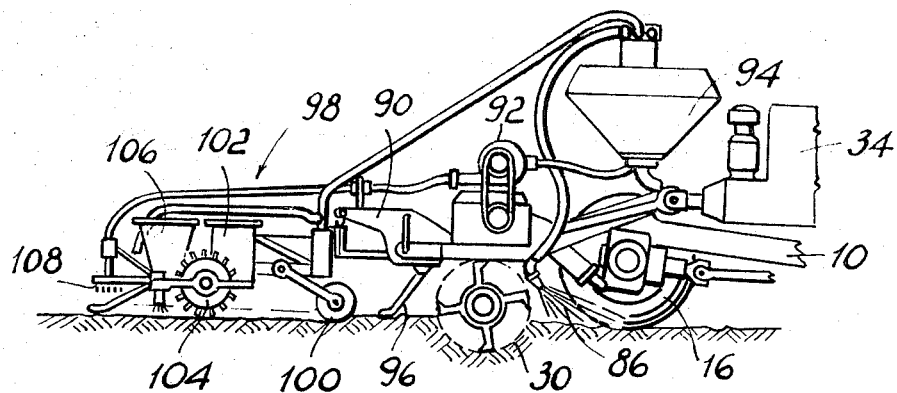
FIGS. 9 and 10 represent complementary apparatus for agronomic treatments which can be interchangeably and removably comprised in the operative assembly for the purpose of carrying out complete agricultural treatments, for example, for the planting of maize and respectively of wheat, as well as the means for feeding said apparatus.
Figure 10:
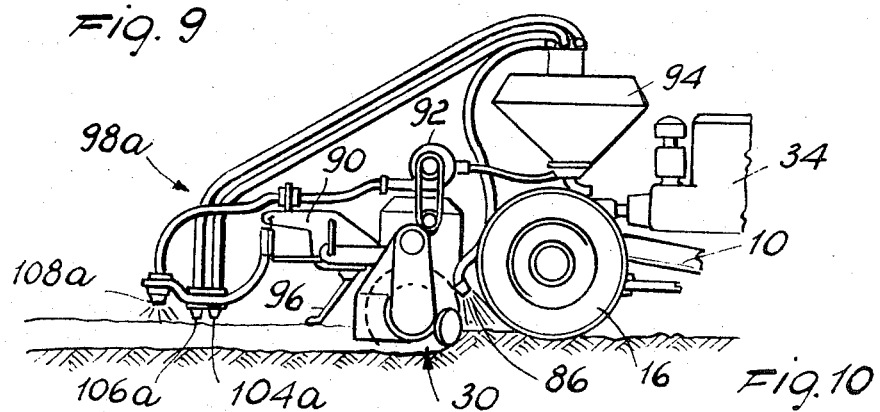

Non-powered plows 60 can be located in correspondence with lateral boxes 46, for the two-fold purpose of offering an auxiliary resistance to the forward displacement of the machine, which resistance has been found to be unexpectedly advantageous to control the variable thrusts to which the machine assembly is subjected in the operation of the rotary hoes, and of opening a groove for the unobstructed passage of the rearwardly positioned boxes 46. As can be observed in particular in FIG. 8, plows 60 may advantageously be of the type comprising a concave disc and supported by means of arm elements 62 and 64, so as to be freely rotatable in hubs 66, about their axes Y—Y slanted with respect to direction X of the translational motion of the machine advances. Further, as can be seen in FIGS. 3 and 4, at the two sides of the hoe assembly there can be positioned other auxiliary devices, such as lateral plates 68 supported on hinges 70, and which can be raised to a position (indicated at 68') wherein they permit the clods and the earth broken up and impelled by the adjacent hoes 32', to be thrown out and spread at the sides of the machine. When plates 68 are lowered (FIG.3) to the vicinity of adjacent hoes 32', the plows 60 positioned forwardly thereof dig grooves which remain unaltered in the passage of the machine and which are useful for instance to provide small drainage ditches between strips of land processed. The operative assembly can be raised and lifted with respect to the surface S on the ground, with respect to which frame 10 has a fixed elevational position, for the purpose of operating at the desired depths, and of allowing the machine to be moved from one working area to another. The aforesaid elevational displacements of the operative assembly are imparted to the mechanical part of the assembly viz. to the hoe assembly, and further to the mechanical or non-mechanical apparatus for the agronomic processing of the soil that are supported by the hoe assembly and constitute, together with it, the operative assembly. Obviously, the means for feeding the apparatus (such as tanks, pumps and the like), are advantageously directly supported by main frame 10. As shown by way of example in FIG. 5 (wherein the raised position of the hoe assembly is fragmentary shown in broken lines) secondary frame 54 of the hoe assembly is connected to main frame 10 through hinges (having a transverse axis passing through a joint 40') by means of sturdy arms 54', and mechanical devices, for instance hydraulic rams 58, are provided for lifting and lowering the hoe assembly, as indicated at A and B respectively, whenever and to the extent desired. The rams exert an upwardly pressure and have a controllable stroke so as to support the assembly when raised and so as to limit its downward displacement and therefore its penetration into the ground, to the extent desired in each case. If the weight of the hoe assembly and parts associated therewith is not always in excess with respect to the reactions of the ground, particularly if the assembly and parts are constructed with such materials and technology as to reduce their weight as much as is allowed by the required mechanical resistance, the rams, which can always be but, in this case must be, two-way ones, assist in causing the assembly to dig into the ground and form in every position thereof a rigid two-way linkage transmitting to the structural masses of the machine the upward reactions to which the assembly is subjected when in operation. The mechanism illustrated for lifting and lowering the hoe assembly can obviously be replaced by another of like effect. Since the machine according to the invention has an unexpectedly high productivity and can be used to carry out a wide variety of agricultural operations in one passage on the ground, including treatments of the soil in depth and several treatments in mutual immediate succession and combination, it can be advantageously provided with a plurality of auxiliary and complementary means. Thus, as schematically illustrated in FIG.1, it can be provided with an agronomic treatment apparatus 80 (which can be constructed by means known in the art) provided with pumps or other suitable devices actuated by means of transmissions powered by operative motor 34, and embodying tanks, containers, distributors, as 82 and 84, and other means, e.g. for the purpose of applying fertilizers, seeds and so on, on the rear of the hoe battery 30, where means for the deep seeding, the levelling of the seeded soil and so forth can also be applied. The great depth at which the soil can be processed by means of the rotary implements of the machine according to this invention, has also been found to be surprisingly associated with an unexpectedly different action on the soil itself. While conventional powered hoes act almost exclusively very finely to comminute, pratically to pulverize the soil, the machine according to this invention, operating at a great depth and advancing at a relatively high speed, actually does mechanical work which can be assimilated to a plowing, inasmuch as the soil is cut up and detached in clods which are subsequently covered with soil carried up from underlying layers. The unique operating features of the new machine also allow the useful adoption of means that are traditionally associated with plowing operations. For example, it becomes possible to distribute, by means of distributors 86 located forwardly instead of rearwardly of the rotating hoes, fertilizers and/or additives or soil integrating substances, which, while applied on the surface, are carried down and distributed in depth by the action of the hoe assembly 30. In FIGS. 9 and 10 auxiliary apparatuses are shown which can be interchangeably associated with the machine hereinbefore described, or with any other machine according to this invention, which can be provided for this purpose with a rear bracket 90, having means for attaching and coupling said apparatus. The machine is further advantageously provided with a pump 92 for feeding herbicides and like agents under pressure.

The fertilizers and like materials can be stored and transported in a suitable multiple tank 94, provided with connections, pressure feeding means and the like of known kinds. Bracket 90 can also carry a levelling member 96 for levelling the ground after the passage of the hoe assembly 30.

The apparatus illustrated in FIG.9 and generally indicated at 98, is particularly adapted for processing the soil for the growing of maize, processing being advantageously preceded by a diffused pneumatic fertilization, in front of the hoes effected, by means 86 also fed from tanks 94. Apparatus 98 comprises a roller 100 per pressing the ground, a device 102-104 for monograms seeing, a device 106 for applying fertilizer on the seeded rows, and a device 108 for applying an herbicide and/or for localized penumatic fertilization.

Apparatus 98a (FIG. 10) for preparing the soil for the growing of wheat, can comprise a simpler bearing structure on the rear of the hoe assembly 30 and the levelling device 96, a nozzle 104a for seeding, for example pneumatic seeding, and a nozzle 106a for pneumatic localized application of fertilizer, all the aforesaid parts being followed by device 108a for the diffused application of herbicides, insecticides and the like.

Figure 11:
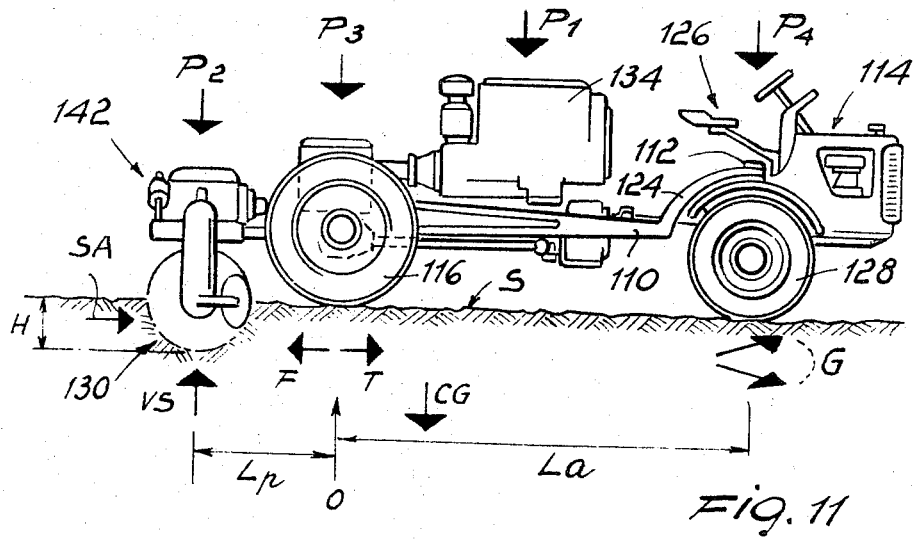
FIG. 11 represents, in lateral diagrammatic view, a further embodiment of the invention, the distribution of various static and dynamic forces being symbolically illustrated thereon in a way generally applicable to any embodiment of the invention.

The overall lightness of the machine as compared to its productivity and the fact that it may not be convenient to keep an agricultural tractor occupied for the periods in which the machine is in operation (which are much longer than for conventional hoes, because of the greater range of usefulness of the new machine) suggest advantageously to provide the machine with an integral steering and longitudinal stabilization mechanism, for example such as shown in FIG. 11.

In this embodiment of the invention, the front portion 124 of main frame 110 of the machine, which frame is provided with bearing and preferably traction wheels 116, is coupled, for example at or near or rearwardly of joint 112, for rotation about a vertical axis, to a steering fore train 114, which takes the place of the conventional tractor, which fore train is provided with steering and control means 126 and with directional and preferably also traction wheels 128. In this case the control could be taken off from the operative motor 134 which actuates the hoe assembly 130, by means of a transmission separate and controlled independently from transmission 142 which drives the hoes, but preferably fore train 114 is provided with its own control motor, which actuates the bearing-traction wheels 116 and preferably also the steering wheels 128, which motor is of a type specifically adapted for traction purposes, and which allows of prolonged displacements on the road, whenever required, while operative motor 134 remains at a standstill, or can constitute an auxiliary source of power, for instance, to supply hydraulic and/or electrical power required for servicing, for starting the operative motor and so forth. The static and dynamic behaviour of the new machine are obviously dependent on the distribution of weights and forces.

For instance, as indicated in FIG. 11, special relevancy is to be attached to weights P1 and P2 (the first of which pertains to the operative motor and the main frame and associated parts, and the second to the hoe assembly and its structure, transmission etc.) which are positioned respectively forwardly and rearwardly of the vertical plane O containing the line connecting the points at which the bearing-traction wheels (16 or 116) bear on the ground; and to the resultant forces P3 and P4 directly bearing on traction wheels 16 or 116 of the main frame and 28 of the tractor or 128 of the steering fore train having the prevalent purpose of assuring the necessary adherence for steering the machine assembly, as schematically indicated at G, besides contributing to its translational displacement.

When the hoe assembly 30 or 130 is in operation, the reaction due to the resistance of the ground and the inertia of the clods, generates variously distributed thrusts which can be resolved into a vertical lifting thrust VS and a horizontal propelling thrust SA. The vertical thrust is subtracted from the weight P2 and sometimes is greater than these weight, particularly if the machine and specifically the assembly positioned rearwardly of the vertical O is constructed with very light materials. Therefore, when the machine is in operation it may be said that its centre of gravity CG (marked in a merely indicative position in FIG. 11) becomes virtually displaced forwardly, and consequently the front resultant P4 is virtually increased (since dynamic forces are added to the static forces) whereby variation of the ratios of the forces causing adherence on the fore and rear wheels of the vehicle is varied and the adherence generating force on the rear wheels is decreased, so that theoretically the traction capacity T of the wheels should decrease.

On the other hand, far from insignificant propelling thrusts SA in the direction of the progress of the machine are generated to an extent that is approximately inversely proportional to the depth H at which the hoes operate, these forces often being greater than the total resistance of the machine, including the tractor or the fore train, to motion along the ground.

In such a case the adherence of the wheels should be such that they can exert a braking action F instead of a traction T.

It has been surprisingly found that a machine according to the invention may be provided with a hoe assembly of very large productivity, viz. of considerable width and capable of operating at considerable depth H, in an overall assembly having a relatively low total weight and including a conventional tractor or a fore train having limited power and weight. In practice it has been surprisingly found that when a tractor or a fore train is provided having a power sufficient to guarantee, with a necessary precautional excess, the displacement of the machine on the road or in the fields when the hoe assembly 30 or 130 is lifted, this power is amply sufficient also to guarantee the operation of the machine even under the most severe operating conditions of the hoe assembly, in an overall machine assembly wherein the ratio of the total power to the total weight is exceptionally high, the expression "total power" including of course the power of operative motor 34 or 134. As stated hereinbefore, the art did not consider it possible, or better had not even considered the possibility of carrying out agricultural operations with rotary implements, operating on large widths and/or with great powers, with a machine assembly of proportionally very limited total weight, this being probably due, at least in part, to the common knowledge of reputedly unavoidable low power/weight ratio of conventional agricultural tractors.

The availability of the new machine has further resulted in discovery of new and surprising effects, the main ones among which will be hereinafter briefly discussed with reference to the graphs of FIGS. 12 and 13. In these graphs special consideration has been given to the size of the clods into which the soil is subdivided while superficial and underlying layers are inter exchanged, the size which is determined by the ground speed of the machine in relation to the speed, size and number of the tines carried by each rotary implement.

The size of the earth fragment or clod (indicated hereinafter by Z) is given by the ratio of the ground speed of the machine to the product of the rotary speed of the implements and the number of tines carried by each implement. Therefore at any given rotary speed of the implements, the size of the clods is directly proportional to the ground speed of the machine and be can assumed as representative of this latter speed.

Figure 12:
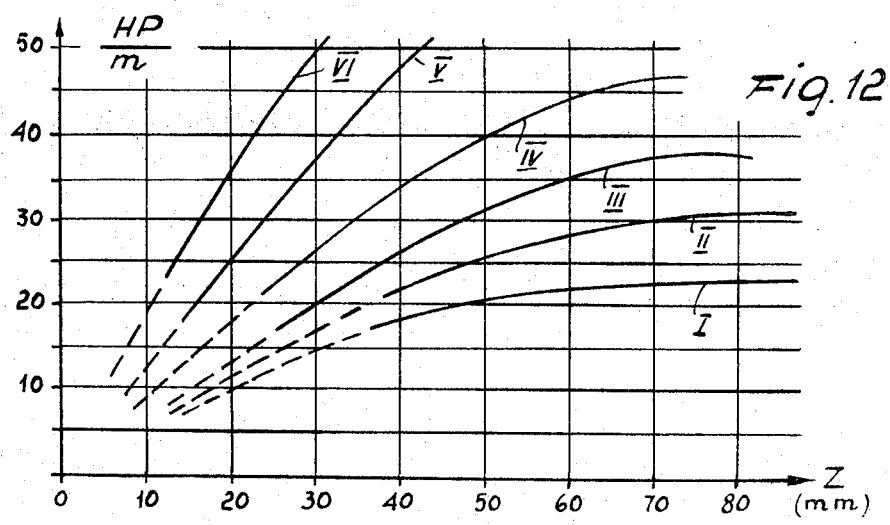
FIGS. 12 and 13 are graphs illustrating certain unexpected phenomena and advantageous effects resulting from the operation of the machine according to this invention.

Curves I–VI of FIG. 12 represent the resistances, expressed in HP per meter of width worked by the machine (HP/m) at progressively increasing depths from 10 to 25 cm., which the machine encounters on land tracts of progressively increasing compactness.

The values that can be deduced from such curves are purely indicative and correspond to average values found in practical tests. These values increase with Z, viz. with the initial size of the clods that are cut out. It is noted that the resistance encountered by the hoes does not increase proportionally with Z (expressed in mm.) but the several curves have a tendency to flatten out as Z increases, particularly at low depths.

Figure 13:
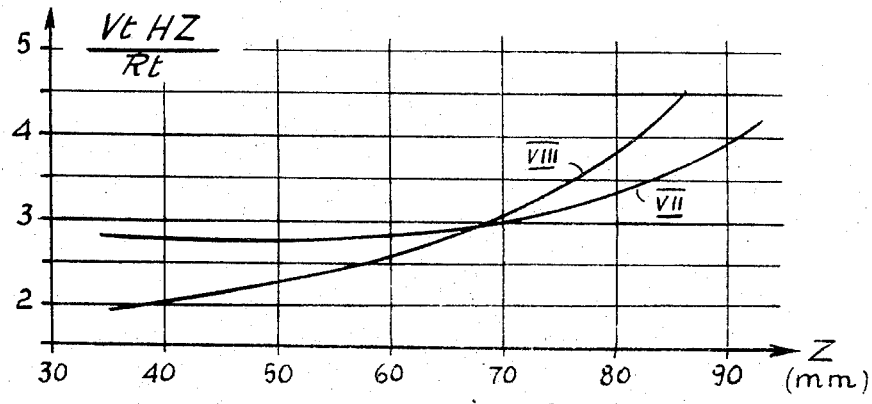

The graph of FIG. 13 shows with its curves VII and VIII an analytical development of the aforesaid results, referred to an average depth of 15 cm. in essentially loose soil and of 20 cm. in more compact soil. The curves represent the function Vt H Z/Rt, wherein:

Rt means the tangential resistance encountered by the implements viz. the resisting couple encountered by the operative motor;

H means the depth reached by the hoes:

Z means the aforesaid initial size of the clods, and therefore, at any given rotary speed of the hoes, the translatory speed of the machine; and Vt means the tangential speed of the fingers or tines which is assumed to be constant.

It is noted therefore that the function above defined tends to remain constant, at different ground speeds represented by Z, when Z decreases as the depth H increases.

Figures 14, 15:
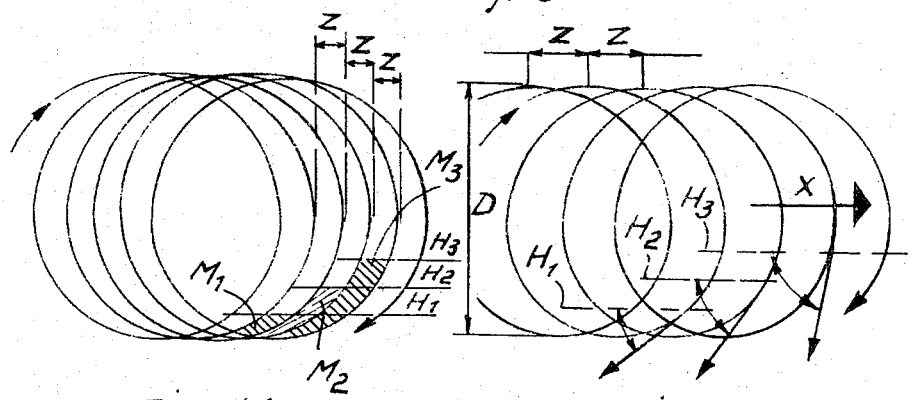
FIGS. 14 and 15 diagrammatically represent, with some alterations in their proportions for better illustration, the cycloids described by any one of the fingers or tines of any one of the rotating implements, for the purpose of illustrating certain effects resulting from their action on the soil at different working depths.

An explanation a posteriori of such unexpected developments, which advantageously permit to attain very high productivities with machines provided with operating motors of smaller size than would have been expected, can be deduced from consideration of the graph of FIG. 14. In FIG. 14 it is seen that for any given value of Z and for different depths H1, H2 and H3, the cross section and therefore the mass M1, M2 and M3 respectively of the earth frangments or clods cut out by the implements, increases at a greater rate than the developed length of the circular arc described by the fingers or tines as they operate to cut out the masses, viz. the clods, and that the amount of the resistance can be considered proportional, though in a loosely approximate manner, to the length of arc.

The graph of FIG. 15, in turn, offers an explanation of the amount and variability of the vertical and horizontal forces VS and SA indicated in FIG. 11 for any given diameter D of the rotary implements and for a suitable Z, and illustrates that the cycloid described by the tines as the machine advances in direction X, the tines having a tangential speed considerably in excess of the ground speed, meets the surface of the ground at an angle which draws closer to the vertical as the depth increases. Obviously the maximum resistance is met in the initial phase of the penetration of the implements into the ground. Therefore while the horizontal thrust is prevalent at the start of penetration, the vertical thrust increases proportionally to the depth of work, but the horizontal thrust never becomes zero since the arc described by the tines always includes an approximately horizontal bottom portion, and also because the acceleration of the clods up to the tangential speed of the implements, which impels the clods rearwards, generates a horizontal reaction. Field tests have proved that it is possible and convenient to construct and operate machines substantially as described, of the kind illustrated in FIGS. 1 and 2, embodying a hoe assembly 30 provided with rotary hoes having a diameter between 40 and 100 cm. and preferably from 55 to 80 cm., adapted to operate efficiently at a depth up to 45 cm. and preferably up to 35 cm. actuated at a speed of rotation from 100 to 250 rpm and preferably of about 130–180 rpm. In most cases such hoes require an operative motor having a power from 40 to 100 HP and preferably of about 60–80 HP per meter of effective width Lu of the hoe assembly. For instance it has been possibly advantageously to construct and test machines of the type of FIGS. 1 and 2 adapted to operate on average soils on a width of 4.50 meters and a depth of 35 cm., powered by an operative motor of 300 HP, and having an overall weight in the order of 7,200 Hg. without load but including all the auxiliary apparatus for fertilizing seeding and spreading of herbicides. A conventionl agricultural tractor having a power of about 60 HP and a weight of about 2,200 Kg. has been amply sufficient for drawing these machines in operation at a ground speed between 1.5 and 5 Km/h, depending of the degree of compactness of the soil and this tractor has been found capable of fully controlling the variable thrusts applied by the hoe assembly both when they were higher and when they were lower than the force actually required to advance the machine along the ground.

The ratio between the power of the control motor and that of the operative motor in machines according to the invention, is preferably comprised in any case between 1:2 and 1:12, and still more preferably between 1:4 and 1:6 when a conventional tractor is used (FIG.1), or between 1:6 and 1:10 when a steering fore train is provided (FIG.11), provided that greater motive powers of the control motor are not required by laws or regulations. The ratio of the weight of the steering and control assembly to the weight of the main frame and all the parts supported thereby (which of course includes the operative assembly) is preferably comprised in any case between 1:1 and 1:8 and still more preferably between 1:2 and 1:3 when the assembly consists of a conventional tractor or between 1:3 and 1:6 when the assembly consists of a steering fore train.

The aforesaid ratios are surprisingly low because since a separate operative motor is provided, the variability of the propulsive thrust of the hoe assembly would have led a person skilled in the art to believe that much greater control powers and weights should have been necessary.

While a number of preferred embodiments of the invention have been described hereinbefore, it will be understood that this has been done merely by way of illustration and that numerous modifications, variations and adaptations may be made therein by skilled persons without departing from the spirit of the invention or exceeding the scope of the appended claims.

I claim:

1. A machine for tilling the soil comprising, in combination, a main frame, means supporting said main frame for translational movement over the ground; an operative assembly, including rotatable implements, operable to work the soil and developing, with the soil, a thrust force tending to drive said main frame at a first speed determined by the reaction of the soil, mounted on said main frame for elevational displacement relative to said main frame; a mechanism supported on wheels and operable to steer and control the translational movement of said main frame; means connecting said mechanism to said main frame for transmitting a reaction force therebetween: first independent motor means on said main frame drivingly connected to said operative assembly to rotate said rotatable implements at a fixed speed in a direction to provide said thrust force tending to drive said main frame, said first independent power means constituting the sole driving means for said operative assembly; and second motor means, independent of said first motor means, and in power ratio thereto not greater than one-half, on said steering and control mechanism constituting the sole driving means for said wheels thereof and tending to drive said steering and control mechanism at a second speed, the relative speed due to said first and second motor means causing a reaction force to be transmitted through said connecting means to counteract increases and decreases in said thrust force; the ratio of the weight of said mechanism to that of said main frame and parts carried thereby being less than 1.

2. A machine for tilling the soil comprising, in combination, a main frame; means supporting said main frame for translational movement over the ground; an operative assembly, including rotatable implements operable to work the soil and developing, with the soil, a thrust force tending to drive said main frame at a first speed determined by the reaction of the soil, mounted on said main frame for elevational displacement relative to said main frame; a mechanism supported on wheels and operable to steer and control the translational movement of said main frame: means connecting said mechanism to said main frame for transmitting a reaction force therebetween; first independent power means on said main frame drivingly connected to said operative assembly to rotate said rotatable implements in a direction to provide said thrust force tending to drive said main frame, said first independent power means constituting the sole driving means for said operative assembly; and second power means, independent of said first power means, on said steering and control mechanism constituting the sole driving means for said wheels thereof and tending to drive said steering and control mechanism at a second speed; the relative speed due to said first and second power means causing a reaction force to be transmitted through said connecting means to counteract increases and decreases in said thrust force.

3. Machine according to claim 2, wherein said steering and control mechanism comprises a tractor operatively connected to said main frame.

4. Machine according to claim 2, wherein said steering and control mechanism comprises a steering fore train coupled to said main frame in front thereof.

5. Machine according to claim 2, in which said operative assembly is a hoe assembly including a plurality of rotatable implements each comprising a rotatable support member and a plurality of tines mounted peripherally on the associated support member and extending laterally out of the plane of rotation of the associated support member.

6. Machine according to claim 2, comprising non-powered plow members mounted to extend laterally and forwardly beyond the rotatable implements, to cut grooves in the ground during translational motion of the main frame and to create a resistance to said motion, the grooves being located at the sides of the strip of ground worked by said rotatable elements.

7. Machine according to claim 2, wherein means are provided to condition the rotatable implements of said operative assembly to engage and mechanically process the soil to a depth of up to 45 centimeters.

8. Machine according to claim 2, comprising means limiting the downward displacement of said operative assembly and blocking said displacement against the weight of said assembly, at a predeterminable maximum negative elevation with respect to the surface of the ground.

9. Machine according to claim 2, comprising means biasing said operative assembly downwardly against the reaction of the ground, to a predetermined maximum negative elevation with respect to the surface of the ground.

10. Machine according to claim 2, in which said means supporting said main frame comprises at least two bearing wheels connected to said main frame; and means selectively operable to connect said bearing wheels to the power means of said steering and control mechanism to drive said bearing wheels to act as traction wheels for said main frame.

11. Machine according to claim 2, wherein the operative assembly is positioned rearwardly, with respect to the direction of translation of the main frame when in operation, of the points at which said main frame bears on the ground, and means for displacing said operative assembly from an elevated inoperative position to operative positions wherein the rotatable implements of said operative assembly penetrate into the ground.

12. Machine according to claim 11, in which the rotatable implements of said operative assembly are divided into at least two sub-assemblies; and means hingedly supporting said sub-assemblies for displacement between an operative position in which they extend transversely of the direction of translational movement of said main frame and in end-to-end coaxial relation with each other, to a retracted position in which said sub-assemblies extend upwardly in juxtaposed relation with each other and on either side of a vertical plane which is parallel to the direction of translational movement of said main frame, whereby to reduce the horizontal dimension of said operative assembly in a direction perpendicular to the direction of translational movement of said main frame.

* * * * *